(12) United States Patent
Liotti et al.

(10) Patent No.: US 9,731,648 B2
(45) Date of Patent: Aug. 15, 2017

(54) CONTROL OF OPERATION OF AUTOMOTIVE DIRECTION INDICATORS

(71) Applicant: C.R.F. Societa' Consortile per Azioni, Orbassano (IT)

(72) Inventors: Luca Liotti, Orbassano (IT); Fabrizio Picariello, Orbassano (IT); Antonella Toffetti, Orbassano (IT)

(73) Assignee: C.R.F. Societa' Consortile per Azioni, Orbassano (IT)

( * ) Notice: Subject to any disclaimer, the term of this patent is extended or adjusted under 35 U.S.C. 154(b) by 52 days.

(21) Appl. No.: 14/897,303

(22) PCT Filed: Jun. 19, 2014

(86) PCT No.: PCT/IB2014/062451
§ 371 (c)(1),
(2) Date: Dec. 10, 2015

(87) PCT Pub. No.: WO2014/203201
PCT Pub. Date: Dec. 24, 2014

(65) Prior Publication Data
US 2016/0129831 A1    May 12, 2016

(30) Foreign Application Priority Data

Jun. 19, 2013  (EP) ..................... 13425085

(51) Int. Cl.
*B60Q 1/34* (2006.01)
*B60Q 1/40* (2006.01)
*B62D 15/02* (2006.01)

(52) U.S. Cl.
CPC ............... *B60Q 1/346* (2013.01); *B60Q 1/40* (2013.01); *B62D 15/021* (2013.01)

(58) Field of Classification Search
CPC . B60Q 1/346; B60Q 1/40; B60Q 1/12; B60Q 2300/122; B62D 15/021;
(Continued)

(56) References Cited

U.S. PATENT DOCUMENTS

| 4,333,071 | A | * | 6/1982 | Kira | .......................... B60Q 1/40 |
| | | | | | 200/61.31 |
| 4,962,366 | A | * | 10/1990 | Hatanaka | .................. B60Q 1/40 |
| | | | | | 340/432 |
| 2006/0187016 | A1 | | 8/2006 | Tsukida et al. | |

FOREIGN PATENT DOCUMENTS

DE    195 34 087 A1    3/1997
DE    199 41 308 A1    3/2001
(Continued)

*Primary Examiner* — Dalena Tran
(74) *Attorney, Agent, or Firm* — Blank Rome LLP

(57) ABSTRACT

An automotive electronic control unit (4) configured to control operation of automotive direction indicators (2) based on motor vehicle-related data and by receiving current steering wheel angle ($\alpha$) and motor vehicle speed (v), determining an initial steering wheel angle ($\alpha_o$) when a direction indicator (2) is activated, determining minimum and maximum steering wheel angles ($\alpha_{min}$, $\alpha_{max}$) reached during the period that the direction indicator is active, computing a steering wheel release angle ($\alpha_r$) based on the current motor vehicle speed (v), the steering wheel release angle ($\alpha_r$) representing the steering wheel angle ($\alpha$) beyond which the motor vehicle's steering wheel is to be turned in the direction indicated by the active direction indicator to cause, when the steering wheel is turned in the opposite direction at the end of steering manoeuvre, the automatic deactivation of the active direction indicator (2), and determining if and when to deactivate the active direction indicator (2) based on the current steering wheel angle ($\alpha$), the
(Continued)

initial steering wheel angle ($\alpha_0$), the minimum and maximum steering wheel angles ($\alpha_{min}$, $\alpha_{max}$) and the steering wheel release angle ($\alpha_r$).

8 Claims, 2 Drawing Sheets

(58) Field of Classification Search
CPC ........ B62D 7/159; B62D 5/046; B62D 7/148; B62G 17/0162; B62G 17/0195; B60R 2021/01313; B60R 2021/01327; B60W 2510/20; B60W 2520/14
USPC ................ 701/41, 36, 38, 70; 180/423, 446; 315/81
See application file for complete search history.

(56) References Cited

FOREIGN PATENT DOCUMENTS

| | | |
|---|---|---|
| DE | 10 2006 042 966 A1 | 3/2008 |
| DE | 10 2007 036 633 A1 | 2/2009 |
| FR | 2 814 998 A1 | 4/2002 |
| FR | 2 967 376 A1 | 5/2012 |
| JP | 2011-131631 A | 7/2011 |

\* cited by examiner

CONTROL OF OPERATION OF AUTOMOTIVE DIRECTION INDICATORS

TECHNICAL FIELD OF THE INVENTION

The present invention relates to controlling operation of automotive direction indicators, in particular to automatic switching off of the direction indicators upon completion of the manoeuvre that required their activation.

STATE OF THE ART

As is known, automotive direction indicators are traditionally mechanically and manually activated by the driver via a lever specially dedicated to this function and forming part of the so-called steering column switch, which, as is known, is a device located behind the steering wheel and equipped with a series of levers through which the driver can control the operation of a series of on-board devices such as the direction indicators, the front and rear screen wipers, the front and rear lights, etc.

Direction indicators of this type may then be deactivated, always mechanically, in two ways: either manually by the driver, via the same dedicated lever, or automatically via a specially provided automatic mechanical deactivation device comprising a coupling, or prong, that engages a bevel gear wheel integral with the steering wheel and which deactivates the direction indicators whilst turning the steering wheel towards the position it had when the direction indicators were activated.

In order for this mechanical device for automatic direction indicator deactivation to operate correctly, it is necessary that the steering wheel is turned in the direction in which the direction indicator was switched on by a fixed steering wheel angle, typically 90°, starting from the steering wheel angle when the direction indicators are activated, otherwise this mechanical device is not able to deactivate the direction indicators when the driver realigns the steering wheel.

This mechanical device for automatic direction indicator deactivation has a series of drawbacks, the main ones of which are represented by the fact of requiring that it be mounted on the steering column and the fact that in certain manoeuvres, such as leaving roundabouts or using motorway slip roads, this device fails to deactivate the direction indicators.

In consequence, electronic automatic direction indicator deactivation devices have been proposed.

For example, DE 10 2006 042 966 A1 discloses an automotive direction indicator system in which the direction indicator signals are automatically cancelled upon determining the completion of the manoeuvre that required their activation, where the completion of the manoeuvre is determined on the basis of the motor vehicle's steering angle and the "distance" from a plurality of predetermined manoeuvres, and where the steering angle is determined on the basis of the radii of curvature of the bend line followed by the motor vehicle and the speed of driving through this bend.

DE 195 34 087 A1 discloses an electronic system for automatically resetting a motor vehicle direction indicator switch, arranged to ensure reliable reset under various driving conditions and in which the electronic automatic reset system comprises a first sensor device to detect the direction and angle of rotation of the motor vehicle's steering wheel, a second sensor device arranged to measure the value of at least one dynamic quantity of the motor vehicle, conveniently comprising one or more from among a motor vehicle speed sensor, a motor vehicle yaw sensor and two ABS sensors associated with the motor vehicle's two front wheels, and an electronic reset device arranged to reset the direction indicator switch on the basis of the signals generated by the two sensor devices.

DE 10 2007 036 633 A1 discloses a device for activation and deactivation of the direction indicators of a motor vehicle, which is provided with actuating devices to indicate the direction of travel and a steering angle sensor and in which an on-board central computer is provided for evaluating signals from the steering angle sensor and other sensors, and for controlling various components of the motor vehicle, in particular, the lights. The on-board central computer processes the signals supplied by the actuating devices to indicate the direction of travel and control the photometric direction indicator devices of the motor vehicle.

DE 199 41 308 A1 discloses a circuit for automatically switching off manually activated direction indicators of a motor vehicle, which deactivates the direction indicators based on the steering movements detected in a certain direction of travel via a sensor and the instantaneous speed of the vehicle.

FR 2 967 376 A1 discloses a method for controlling direction indicators during a change of direction of a motor vehicle, in which the steering angle is acquired and analysed to check if a threshold value, indicative of the motor vehicle performing a manoeuvre or change of direction, is reached or exceeded, and in which the direction indicators are switched off if the steering angle returns to a reference position indicative of the motor vehicle having completed the manoeuvre or change of direction.

JP 2011 131631 A discloses a direction indicator control device designed to prevent erroneous switching off of the direction indicators when turning to the right or left. In particular, in the case where the steering angle reaches a certain switch-off angle, it is determined to have turned to the right or left and so the direction indicators are switched off. On the other hand, in the case where the steering angle is less than the switch-off angle, it is determined to have changed lane when the steering angle reaches a first or second peak, upon which the direction indicators are automatically switched off.

SUBJECT AND SUMMARY OF THE INVENTION

The object of the present invention is to provide an automotive electronic direction indicator control system that is operationally simpler than the known solutions and that, at the same time, is able to automatically and reliably deactivate them upon completion of a wide variety of manoeuvres that required their activation.

According to the present invention, an automotive electronic control unit configured to control operation of automotive direction indicators is therefore provided, as defined in the appended claims.

DETAILED DESCRIPTION OF PREFERRED EMBODIMENTS OF THE INVENTION

The present invention will now be described in detail, with reference to the attached figures, to enable an expert in the field to embody it and use it. Various modifications to the described embodiments will be immediately obvious to experts in the field, and the generic principles described herein can be applied to other embodiments and applications without departing from the scope of the present invention, as defined in the appended claims. Thus, the present invention is not intended to be limited to the embodiments set forth herein, but is to be accorded the widest scope consistent with the principles and features disclosed and claimed herein.

Figure 1:
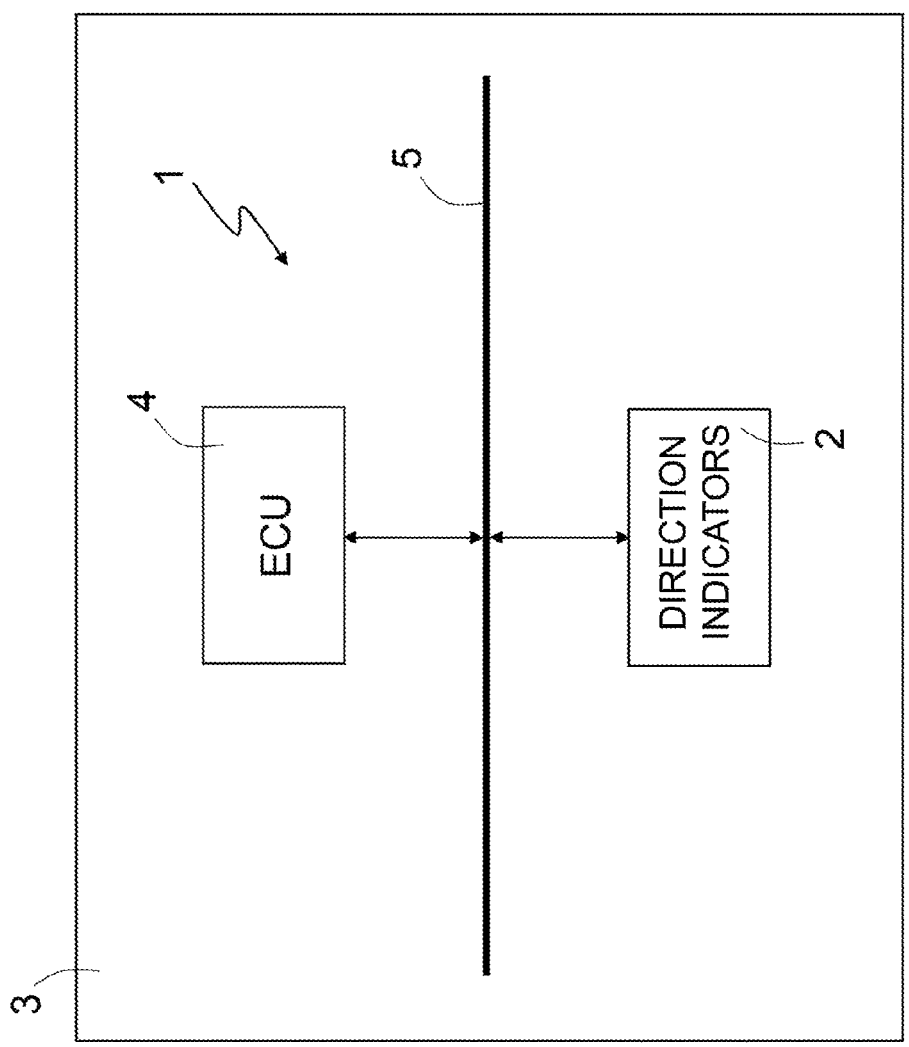
FIG. 1 shows a functional block diagram of an automotive electronic direction indicator control system according to the present invention.

In FIG. 1, reference numeral 1 indicates, as a whole, an automotive electronic control system, of which only the parts concerning the control of direction indicators 2 of a motor vehicle 3 are shown.

The electronic control system 1 essentially comprises an electronic control unit 4 connected to an automotive on-board communication network 5, for example CAN, FlexRay, or others, through which it receives automotive quantities needed to perform the operations for which it has been programmed and in which, among other things, a control software for controlling operation of the direction indicators 2 of the motor vehicle 3 is stored, the control software causing, when executed, the electronic control unit 4 to become configured and consequently operate as described in detail below.

The electronic control system 1 is designed to operate indifferently with direction indicators 2 that can be activated either manually and mechanically by a specially provided lever or automatically and electronically by the electronic control system 1, based on position-related and motor vehicle path-related information supplied, for example, by an infotainment system of the motor vehicle 3 provided with localization and navigation functionality.

The direction indicator control software essentially comprises:
- a first code portion designed to perform, when executed, the following operations:
  - receive current steering wheel angle $\alpha$ and current motor vehicle speed v through the on-board communication network,
  - compute steering wheel angle thresholds, as a function of the current motor vehicle speed v, thresholds with which the current steering wheel angle $\alpha$ is compared to determine the manoeuvre performed by the motor vehicle and comprising a minimum left-hand threshold $\alpha s_{min}$, a maximum left-hand threshold $\alpha s_{max}$, a minimum right-hand threshold $\alpha d_{min}$ and a maximum right-hand threshold $\alpha d_{max}$,
  - determine a manoeuvre performed by the motor vehicle based on the current steering wheel angle $\alpha$ and the steering wheel angle thresholds, in particular by measuring the time during which the steering wheel angle $\alpha$ satisfies certain relations with the steering wheel angle thresholds, in particular during which it is above and/or below the thresholds, and then determining the manoeuvre performed by the motor vehicle based on the measured times, and
- a second code portion designed to perform, when executed, the following operations:
  - receive the current steering wheel angle $\alpha$ and the current motor vehicle speed v through the on-board communication network,
  - receive information on the manoeuvre performed by the motor vehicle as determined by the first code portion,
  - store an initial steering wheel angle $\alpha_0$ at the moment of activation of a direction indicator,
  - determine minimum and maximum steering wheel angles $\alpha_{min}$ and $\alpha_{max}$ during the period that the direction indicator is active, these angles representing the maximum steering wheel angles, in absolute values, reached during a right-turn manoeuvre and a left-turn manoeuvre, respectively,
  - compute a steering wheel release angle $\alpha_r$, defined as the steering wheel angle beyond which the steering wheel must be turned in the direction indicated by the active direction indicator to cause the automatic deactivation of the direction indicator when the steering wheel is turned in the opposite direction at the end of the steering manoeuvre,; and
  - determine if and when to deactivate the active direction indicator based on $\alpha$, $\alpha_0$, $\alpha_{min}$, $\alpha_{max}$ and $\alpha_r$.

Optionally, it can convenient to disable automatic deactivation of the direction indicators during predetermined manoeuvres where, regardless of steering wheel movements, it is convenient to keep the direction indicator active until the end of the manoeuvre. The direction indicator can then be deactivated at the end of the manoeuvre, either manually by the driver or automatically in response to a signal indicating the completion of the manoeuvre, provided by a manoeuvre identifier.

Disabling the automatic deactivation of the direction indicators can be particularly useful during reversing manoeuvres, especially when parking in reverse, during which it is useful to keep the direction indicator active while the reverse gear is engaged. Optionally, in some manoeuvres, it might also be convenient to correct the steering wheel release angle $\alpha_r$ depending on the manoeuvre performed by the motor vehicle. For example, always referring to manoeuvres in which it may be useful to disable the automatic deactivation of the direction indicators, this disablement could be achieved by setting the steering wheel release angle $\alpha_r$ to a very high value, for example 600°, such that it can never be exceeded.

With regard to the current steering wheel angle $\alpha$, it should be specified that in the automotive field, as in the present description, the convention is adopted according to which the steering wheel angle $\alpha$ is zero when the wheels are aligned with the axis of the motor vehicle and takes positive values when the steering wheel is turned to the left and negative values when turned to the right.

With regard to the steering wheel release angle $\alpha_r$, this is computed as a function of the current motor vehicle speed v, and in particular in a manner such that it decreases as the current motor vehicle speed v increases and becomes larger as the motor vehicle speed approaches zero.

The reason for this choice lies in the fact that the more the current motor vehicle speed v increases in a curve, the more the lateral acceleration to which the driver is subjected increases, thereby inducing him/her to turn the steering wheel less as the current motor vehicle speed v increases.

By way of non-limitative example, the steering wheel release angle $\alpha_r$ could be computed based on the formula:

$$\alpha_r = F(v)$$

where $F(v)$ is an opportune decreasing function of speed, which could also depend on the type of manoeuvre identified.

Instead, with regard to determining if and when to deactivate the direction indicators, this is carried out on the basis of the type of manoeuvre performed by the motor vehicle. Purely by way of example, the case can be considered where the motor vehicle is travelling along a substantially straight trajectory (therefore $\alpha_0$ is less than $\alpha_r/2$), and the driver activates the left-hand direction indicator and then steers left: if the maximum left-hand steering angle $\alpha_{max}$ is greater than $\alpha_r$, then the left-hand direction indicator must be deactivated as soon as the driver steers in the opposite direction and the value of the steering wheel angle $\alpha$ is just above that of when the direction indicator was activated. Translating everything into formulas, the deactivation of the left-hand direction indicator must take place as soon as the steering wheel angle $\alpha$ satisfies an inequality of the type:

$$\alpha < \alpha_0 + \frac{\alpha_r}{k}$$

where k is an opportune coefficient that controls the anticipation with which the direction indicator is deactivated when the manoeuvre ends.

The deactivation strategy of a direction indicator also depends on the relative sign between the initial steering wheel angle $\alpha_0$ at which the direction indicator was activated and the maximum steering angle reached during the manoeuvre performed, which, as previously mentioned, is equal to $\alpha_{max}$ in the case of steering to the left and $\alpha_{min}$ in the case of steering to the right.

Purely by way of example, a motor vehicle that is on a roundabout and takes a turn-off exit can be considered. While travelling around the roundabout, the steering wheel angle $\alpha$ will be greater than zero (in the case of a country where one drives on the right) and therefore the driver will activate a direction indicator when $\alpha_0$ will be greater than zero. As soon as the driver starts to steer to the right to leave the roundabout, the steering wheel angle $\alpha$ will reach a steering wheel angle $\alpha_{min}$: in this case, $\alpha_0$ and $\alpha_{min}$ have different signs. In the phase of realigning the steering wheel to the left, deactivation of the direction indicator should not take place when the steering wheel angle $\alpha$ is close to $\alpha_0$, but when the steering wheel angle $\alpha$ is close to zero, i.e. when the trajectory is almost perfectly straight.

Translating the foregoing into formulas, in the case where $\alpha_0$ and $\alpha_{min}$ have different signs, deactivation of the direction indicator takes place as soon as an inequality of the following type is satisfied:

$$\alpha < \frac{\alpha_0}{k}$$

in the case of leaving a roundabout on roads where one drives on the right (Italy for example), while the sign of the inequality is inverted on roads where one drives on the left (Great Britain for example).

Instead, with regard to determining the manoeuvre performed by the motor vehicle, it is not possible to provide a single criterion for all manoeuvres, but it is necessary to develop one for each manoeuvre that it is wished to identify.

Purely by way of example, the identification of a manoeuvre constituted by the motor vehicle leaving a roundabout can be carried out on the basis of the trend over time of the steering wheel angle $\alpha$, which for this manoeuvre is generally of a sinusoidal type. In fact, upon entering the roundabout, the steering wheel is turned to the right, the steering wheel angle $\alpha$ decreases and drops below a certain threshold that corresponds to that which was previously called the minimum right-hand threshold $\alpha d_{min}$. The steering wheel then continues to be turned to the right until it exceeds another threshold that corresponds to that which was previously called the maximum right-hand threshold $\alpha d_{max}$. After this, the steering wheel is turned to the left and so the steering wheel angle $\alpha$ returns first to zero and then, similarly to what happened when steering to the right, it passes a first and a second threshold that correspond to those which were previously called the minimum left-hand threshold $\alpha s_{min}$ and maximum left-hand threshold $\alpha s_{max}$.

Therefore, using the following terms:

$\Delta t1$ as the time for which the steering wheel angle $\alpha$ remains between $\alpha d_{min}$ and $\alpha d_{max}$, $\Delta t2$ as the time for which the steering wheel angle $\alpha$ remains below $\alpha d_{max}$, $\Delta t3$ as the time taken for the steering wheel angle as to pass from $\alpha d_{max}$ to $\alpha s_{max}$, driving around a roundabout can be identified if the following relation is satisfied:

$$\Delta t3 > k_1 * (\Delta t1 + k_2 * \Delta t2)$$

where $k_1$ and $k_2$ are two experimentally-determined calibration coefficients that depend on the driver's driving style.

Figure 2:
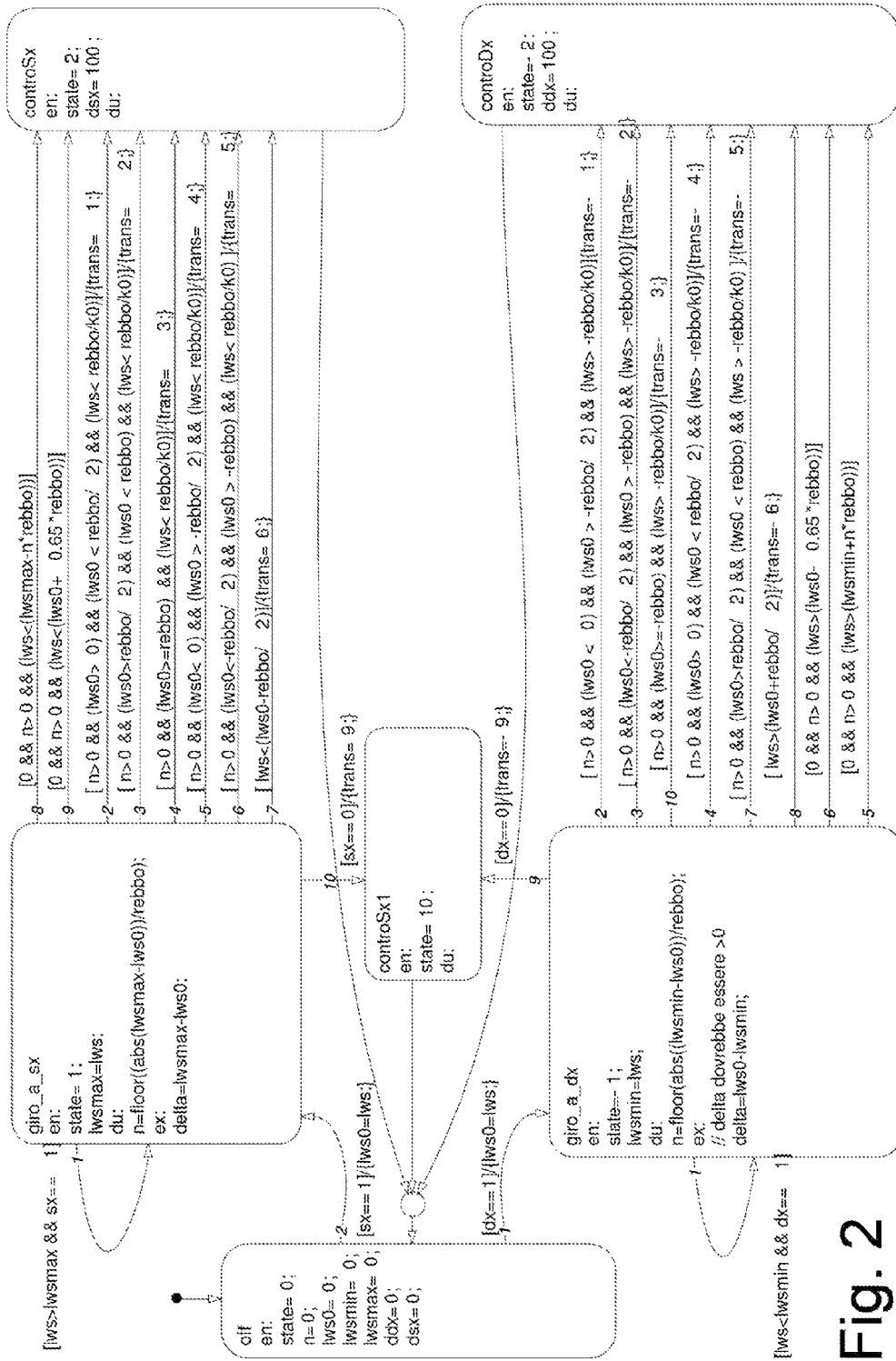
FIG. 2 shows an example of a finite state machine representing the operations carried out by a direction indicator control software to identify the manoeuvres performed by a motor vehicle.

The operations carried out by the direction indicator control software to identify the manoeuvres performed by the motor vehicle can be represented, for each type of manoeuvre that it is wished to identify, by means of a corresponding finite state machine, an example of which is shown in FIG. 2 and which regards the deactivation of the left-hand direction indicator at the end of different left-turn manoeuvres.

Essentially, if the integer part of the ratio between ($\alpha_{max}$ and $\alpha_0$) and $\alpha_r$ is indicated as n, and an opportune coefficient is indicated as k, the left-hand direction indicator is automatically deactivated when one of the following conditions occurs:

1. normal turn
   [n>0 AND ($\alpha<(\alpha_0+\Delta/2)$)]
2. normal turn (small steering angle)
   [($\alpha_0>0$ AND $\alpha_0<\alpha_r/2$) AND ($\alpha<(\alpha_0-\alpha_r/2)$)]
3. normal turn (medium steering angle)
   [($\alpha_0>\alpha_r/2$ AND $\alpha_0<\alpha_r$) AND ($\alpha<(\alpha_0-\alpha_r/2)$)]
4. turn with steering wheel initially turned slightly to the right
   [($\alpha_0<0$ AND $\alpha s_{max}>\alpha_r/4$) AND ($\alpha<0.5* \alpha s_{max}$)]
5. turn with steering wheel initially turned fully to the right
   [(($\alpha s_{max}-\alpha_0)>\alpha_r/2$ AND $\alpha_0<0$ AND $\alpha s_{max}<0$) AND ($\alpha<\alpha s_{max}+0.15*\alpha_r$)]
6. turn aborted
   [$\alpha<(\alpha_0-\alpha_r/2)$]

According to a different embodiment of the present invention, the first code portion of the direction indicator control software provided to identify the manoeuvre performed by the motor vehicle on the basis of the steering wheel angle $\alpha$ and the steering wheel angle thresholds $\alpha s_{min}$, $\alpha s_{max}$, $\alpha d_{min}$ and $\alpha d_{max}$ could be omitted.

Therefore, according to this embodiment, those operations performed by the second code portion of the direction indicator control software on the basis of the information provided by the first code portion on the manoeuvre performed by the motor vehicle are not carried out, and in particular the correction of the steering wheel release angle $\alpha_r$ and the disablement of automatic direction indicator deactivation.

Instead, according to this embodiment, the automatic deactivation of a direction indicator is carried out when one of the following conditions occurs (valid for a left-hand direction indicator):
1. standard manoeuvre
   [n>0 AND ($\alpha < \alpha_0/k$)]
2. anomalous manoeuvre
   [$\alpha < \alpha_0/k - 90°$]
which, as can be appreciated, are independent of $\alpha s_{min}$, $\alpha s_{max}$, $\alpha d_{min}$ and $\alpha d_{max}$, which are instead used in the previously described embodiment.

From the foregoing description, numerous advantages can be achieved with, the present invention with respect to the known art.

In particular, of these advantages, it may be appreciated that direction indicator deactivation performed based on the initial steering wheel angle $\alpha_0$ allows managing direction indicator deactivation also in manoeuvres in which this is not always assured by the mechanical system, as in the case of motorway slip roads and leaving roundabouts.

Furthermore, direction indicator deactivation carried out based on the manoeuvre performed by the motor vehicle allows enabling different release conditions each time in order to avoid undesired deactivation.

Finally, computation of the steering wheel release angle ($\alpha_r$) based on a function that decreases as the current motor vehicle speed (v) increases and dependent on the manoeuvre performed by the motor vehicle, allows modifying the release thresholds in real time so that they adapt to the vehicle's dynamics and are effective even when, at high speed, steering wheel travel reduces.

The invention claimed is:

1. An automotive electronic control unit configured to control operation of direction indicators of a motor vehicle based on motor vehicle-related data,
   the automotive electronic control unit is configured to:
      receive current steering wheel angle ($\alpha$) and motor vehicle speed (v),
      determine an initial steering wheel angle ($\alpha_0$) when a direction indicator is activated,
      determine minimum and maximum steering wheel angles ($\alpha_{min}$, $\alpha_{max}$) reached during when the direction indicator is active, the minimum and maximum steering wheel angles ($\alpha_{min}$, $\alpha_{max}$) representing the maximum steering wheel angles reached by the steering wheel while steering to the right and to the left, respectively,
      compute a steering wheel release angle ($\alpha_r$) based on the current motor vehicle speed (v), the steering wheel release angle ($\alpha_r$) representing the steering wheel angle ($\alpha$) beyond which the motor vehicle's steering wheel is to be turned in the direction indicated by the active direction indicator to cause, when the steering wheel is turned in the opposite direction, the automatic deactivation of the active direction indicator,
      determine if and when to deactivate the active direction indicator based on the current steering wheel angle ($\alpha$), the initial steering wheel angle ($\alpha_0$), the minimum and maximum steering wheel angles ($\alpha_{min}$, $\alpha_{max}$), and the steering wheel release angle ($\alpha_r$);
   the automotive electronic control unit is further configured to:
      recognize a maneuver performed by the motor vehicle, and
      adapt active direction indicator deactivation strategy based the recognized maneuver;
   wherein recognizing a maneuver performed by the motor vehicle comprises:
      computing steering wheel angle thresholds as a function of the current motor vehicle speed (v); and
      determining a maneuver performed by the motor vehicle based on the current steering wheel angle ($\alpha$) and the steering wheel angle thresholds ($\alpha s_{min}$, $\alpha s_{max}$, $\alpha d_{min}$, $\alpha d_{max}$);
   and wherein determining a maneuver performed by the motor vehicle based on the current steering wheel angle ($\alpha$) and the steering wheel angle thresholds ($\alpha s_{min}$, $\alpha s_{max}$, $\alpha d_{min}$, $\alpha d_{max}$) comprises:
      measuring times during which the current steering wheel angle ($\alpha$) satisfies predetermined relations with the steering wheel angle thresholds ($\alpha s_{min}$, $\alpha s_{max}$, $\alpha d_{min}$, $\alpha d_{max}$); and
      determining the maneuver performed by the motor vehicle based on the measured times;
   wherein the steering wheel angle thresholds comprise a minimum left-hand threshold ($\alpha s_{min}$), a maximum left-hand threshold ($\alpha s_{max}$), a minimum right-hand threshold ($\alpha d_{min}$), and a maximum right-hand threshold ($\alpha d_{max}$).

2. Software loadable in an automotive electronic control unit and designed to cause, when executed, the automotive electronic control unit to become configured as claimed in claim 1.

3. The automotive electronic control unit of claim 1, further configured to:
   compute the steering wheel release angle ($\alpha_r$) based on a function such that the steering wheel release angle ($\alpha_r$) decreases as the current motor vehicle speed (v) increases.

4. The automotive electronic control unit of claim 3, wherein the decreasing function depends on the maneuver performed by the motor vehicle.

5. An automotive electronic control unit configured to control operation of direction indicators of a motor vehicle based on motor vehicle-related data,
   the automotive electronic control unit is configured to:
      receive current steering wheel angle ($\alpha$) and motor vehicle speed (v),
      determine an initial steering wheel angle ($\alpha_0$) when a direction indicator is activated,
      determine minimum and maximum steering wheel angles ($\alpha_{min}$, $\alpha_{max}$) reached during when the direction indicator is active, the minimum and maximum steering wheel angles ($\alpha_{min}$, $\alpha_{max}$) representing the maximum steering wheel angles reached by the steering wheel while steering to the right and to the left, respectively,
      compute a steering wheel release angle ($\alpha_r$) based on the current motor vehicle speed (v), the steering wheel release angle ($\alpha_r$) representing the steering wheel angle ($\alpha$) beyond which the motor vehicle's steering wheel is to be turned in the direction indicated by the active direction indicator to cause, when the steering wheel is turned in the opposite direction, the automatic deactivation of the active direction indicator,
      determine if and when to deactivate the active direction indicator based on the current steering wheel angle ($\alpha$), the initial steering wheel angle ($\alpha_0$), the minimum and maximum steering wheel angles ($\alpha_{min}$, $\alpha_{max}$), and the steering wheel release angle ($\alpha_r$), and disable automatic deactivation of the direction indicators based on the steering wheel angle during parking in reverse gear until the end of the maneuver, the automotive electronic control unit is further configured to:

recognize a maneuver performed by the motor vehicle, and adapt active direction indicator deactivation strategy based the recognized maneuver; and wherein recognizing a maneuver performed by the motor vehicle comprises:

computing steering wheel angle thresholds as a function of the current motor vehicle speed (v); and determining a maneuver performed by the motor vehicle based on the current steering wheel angle ($\alpha$) and the steering wheel angle thresholds ($\alpha s_{min}$, $\alpha s_{max}$, $\alpha d_{min}$, $\alpha d_{max}$);

and wherein determining a maneuver performed by the motor vehicle based on the current steering wheel angle ($\alpha$) and the steering wheel angle thresholds ($\alpha s_{min}$, $\alpha s_{max}$, $\alpha d_{min}$, $\alpha d_{max}$) comprises:

measuring times during which the current steering wheel angle ($\alpha$) satisfies predetermined relations with the steering wheel angle thresholds ($\alpha s_{min}$, $\alpha s_{max}$, $\alpha d_{min}$, $\alpha d_{max}$); and determining the maneuver performed by the motor vehicle based on the measured times.

6. The automotive electronic control unit of claim 5, wherein the steering wheel angle thresholds comprise a minimum left-hand threshold ($\alpha s_{min}$), a maximum left-hand threshold ($\alpha s_{max}$), a minimum right-hand threshold ($\alpha d_{min}$), and a maximum right-hand threshold ($\alpha d_{max}$).

7. An automotive electronic control unit configured to control operation of direction indicators of a motor vehicle based on motor vehicle-related data, the automotive electronic control unit is configured to:

receive current steering wheel angle ($\alpha$) and motor vehicle speed (v), determine an initial steering wheel angle ($\alpha_0$) when a direction indicator is activated, determine minimum and maximum steering wheel angles ($\alpha_{min}$, $\alpha_{max}$) reached during when the direction indicator is active, the minimum and maximum steering wheel angles ($\alpha_{min}$, $\alpha_{max}$) representing the maximum steering wheel angles reached by the steering wheel while steering to the right and to the left, respectively, compute a steering wheel release angle ($\alpha_r$) based on the current motor vehicle speed (v), the steering wheel release angle ($\alpha_r$) representing the steering wheel angle ($\alpha$) beyond which the motor vehicle's steering wheel is to be turned in the direction indicated by the active direction indicator to cause, when the steering wheel is turned in the opposite direction, the automatic deactivation of the active direction indicator, and determine if and when to deactivate the active direction indicator based on the current steering wheel angle ($\alpha$), the initial steering wheel angle ($\alpha_0$), the minimum and maximum steering wheel angles ($\alpha_{min}$, $\alpha_{max}$), the steering wheel release angle ($\alpha_r$);

the automotive electronic control unit is further configured to:

compute the steering wheel release angle ($\alpha_r$) based on a function such that the steering wheel release angle ($\alpha_r$) decreases as the current motor vehicle speed (v) increases, wherein the decreasing function depends on the maneuver performed by the motor vehicle, recognize a maneuver performed by the motor vehicle, and adapt active direction indicator deactivation strategy based the recognized maneuver;

wherein recognizing a maneuver performed by the motor vehicle by:

computing steering wheel angle thresholds as a function of the current motor vehicle speed (v); and determining a maneuver performed by the motor vehicle based on the current steering wheel angle ($\alpha$) and the steering wheel angle thresholds ($\alpha s_{min}$, $\alpha s_{max}$, $\alpha d_{min}$, $\alpha d_{max}$);

and wherein determining a maneuver performed by the motor vehicle based on the current steering wheel angle ($\alpha$) and the steering wheel angle thresholds ($\alpha s_{min}$, $\alpha s_{max}$, $\alpha d_{min}$, $\alpha d_{max}$) comprises:

measuring times during which the current steering wheel angle ($\alpha$) satisfies predetermined relations with the steering wheel angle thresholds ($\alpha s_{min}$, $\alpha s_{max}$, $\alpha d_{min}$, $\alpha d_{max}$); and determining the maneuver performed by the motor vehicle based on the measured times;

wherein the steering wheel angle thresholds comprise a minimum left-hand threshold ($\alpha s_{min}$), a maximum left-hand threshold ($\alpha s_{max}$), a minimum right-hand threshold ($\alpha d_{min}$), and a maximum right-hand threshold ($\alpha d_{max}$).

8. An automotive electronic control unit configured to control operation of direction indicators of a motor vehicle based on motor vehicle-related data, the automotive electronic control unit is configured to:

receive current steering wheel angle ($\alpha$) and motor vehicle speed (v), determine an initial steering wheel angle ($\alpha_0$) when a direction indicator is activated, determine minimum and maximum steering wheel angles ($\alpha_{min}$, $\alpha_{max}$) reached during when the direction indicator is active, the minimum and maximum steering wheel angles ($\alpha_{min}$, $\alpha_{max}$) representing the maximum steering wheel angles reached by the steering wheel while steering to the right and to the left, respectively, compute a steering wheel release angle ($\alpha_r$) based on the current motor vehicle speed (v), the steering wheel release angle ($\alpha_r$) representing the steering wheel angle ($\alpha$) beyond which the motor vehicle's steering wheel is to be turned in the direction indicated by the active direction indicator to cause, when the steering wheel is turned in the opposite direction, the automatic deactivation of the active direction indicator, and determine if and when to deactivate the active direction indicator based on the current steering wheel angle ($\alpha$), the initial steering wheel angle ($\alpha_0$), the minimum and maximum steering wheel angles ($\alpha_{min}$, $\alpha_{max}$), the steering wheel release angle ($\alpha_r$), wherein the automotive electronic control unit is further configured to:

compute the steering wheel release angle (($\alpha_r$) based on a function such that the steering wheel release angle ($\alpha_r$) decreases as the current motor vehicle speed (v) increases, wherein the decreasing function depends on the maneuver performed by the motor vehicle, and disable automatic deactivation of the direction indicators based on the steering wheel angle during parking in reverse gear until the end of the maneuver.

\* \* \* \* \*